United States Patent
Fletcher

(10) Patent No.: US 12,282,924 B2
(45) Date of Patent: Apr. 22, 2025

(54) SYSTEMS AND METHODS FOR STORING DYNAMIC DATA

(71) Applicant: Capital One Services, LLC, McLean, VA (US)

(72) Inventor: Abel Fletcher, Prosper, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 544 days.

(21) Appl. No.: 17/494,617

(22) Filed: Oct. 5, 2021

(65) Prior Publication Data
US 2023/0104119 A1    Apr. 6, 2023

(51) Int. Cl.
*G06N 20/00* (2019.01)
*G02F 1/133* (2006.01)
*G06Q 20/40* (2012.01)

(52) U.S. Cl.
CPC ... *G06Q 20/40145* (2013.01); *G02F 1/13324* (2021.01); *G06N 20/00* (2019.01); *G06Q 20/4016* (2013.01)

(58) Field of Classification Search
CPC ......... G06Q 20/40145; G06Q 20/4016; G06N 20/00; G02F 1/13324
See application file for complete search history.

(56) References Cited

U.S. PATENT DOCUMENTS

2017/0221032 A1* 8/2017 Mazed .................. G06Q 20/321
2017/0287127 A1* 10/2017 Chung ................... G06F 16/00
2018/0096326 A1* 4/2018 Szeto ..................... G06Q 50/06
2020/0019970 A1* 1/2020 Pham .................. G06Q 20/3224
2020/0184438 A1* 6/2020 Szeto ................. G06Q 30/0201
2023/0109761 A1* 4/2023 Hatter ................... H04L 9/3255
                                                            705/44

FOREIGN PATENT DOCUMENTS

CA       3049042 A1 *   1/2020   ......... G06K 9/00087

OTHER PUBLICATIONS

Hua; Picture identification verification and authentication using biometric features and watermarks, Proceedings of SPIE, 2005, vol. 6015 (1), p. 60150E-60150E-10.*

* cited by examiner

*Primary Examiner* — Ilse I Immanuel
(74) *Attorney, Agent, or Firm* — TROUTMAN PEPPER LOCKE LLP; Christopher J. Forstner; John A. Morrissett

(57) ABSTRACT

Disclosed embodiments may include a device that may receive data corresponding to transaction card(s) associated with a user. The device may receive first photograph(s) of the user, the first photograph(s) associated with first respective date(s) and first respective time(s). The device may dynamically display a first most recent photograph. The device may receive a request from the user to complete a transaction, the request comprising a selection to utilize first data of the data corresponding to at least one transaction card of the transaction card(s). The device may retrieve the first data to enable the user to complete the transaction. The device may also receive a second photograph associated with a second date and a second time. The device may update the dynamic display with a second most recent photograph by comparing the first respective date(s) and first respective time(s) to the second date and second time.

12 Claims, 5 Drawing Sheets

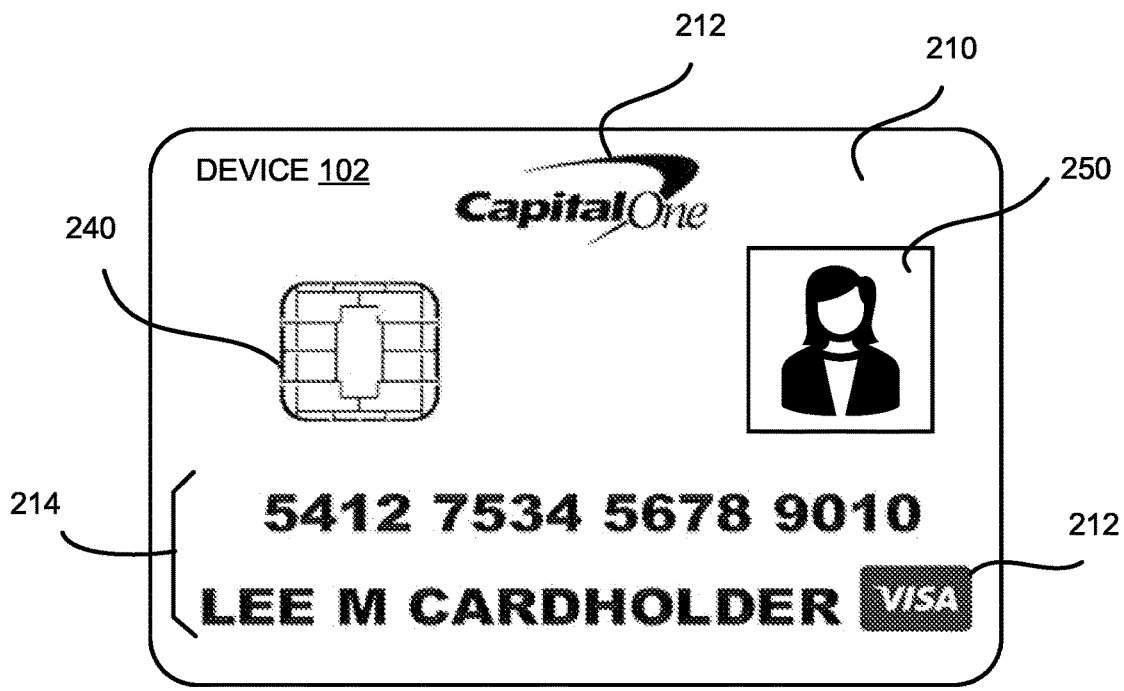
FIG. 2A
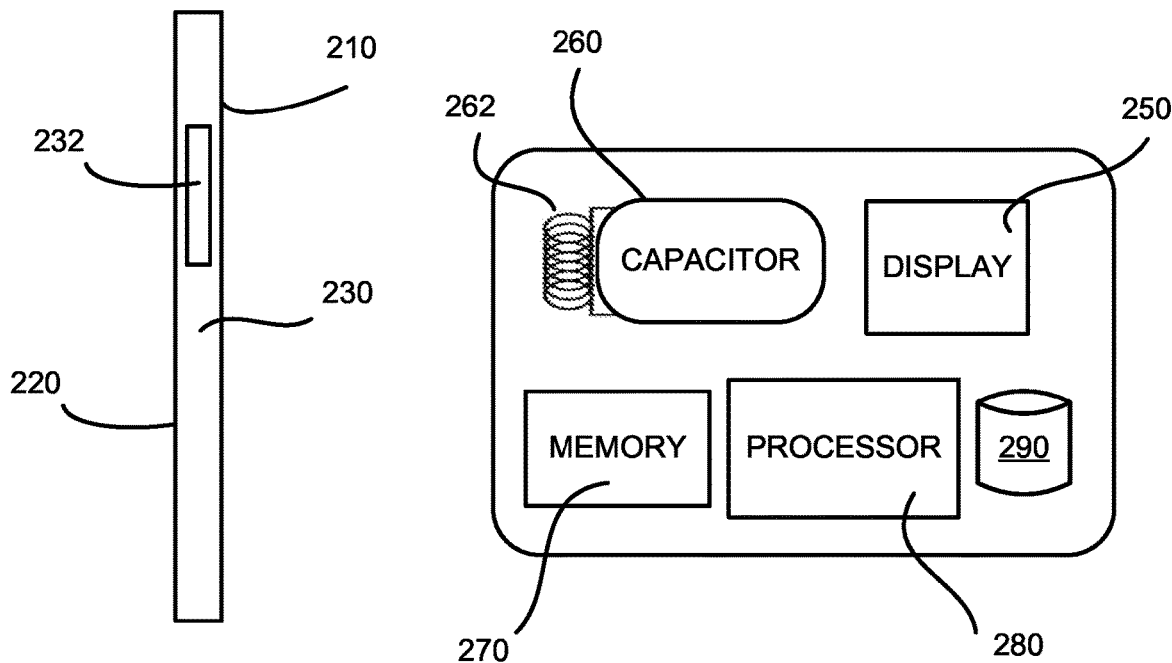
FIG. 2B
FIG. 2C

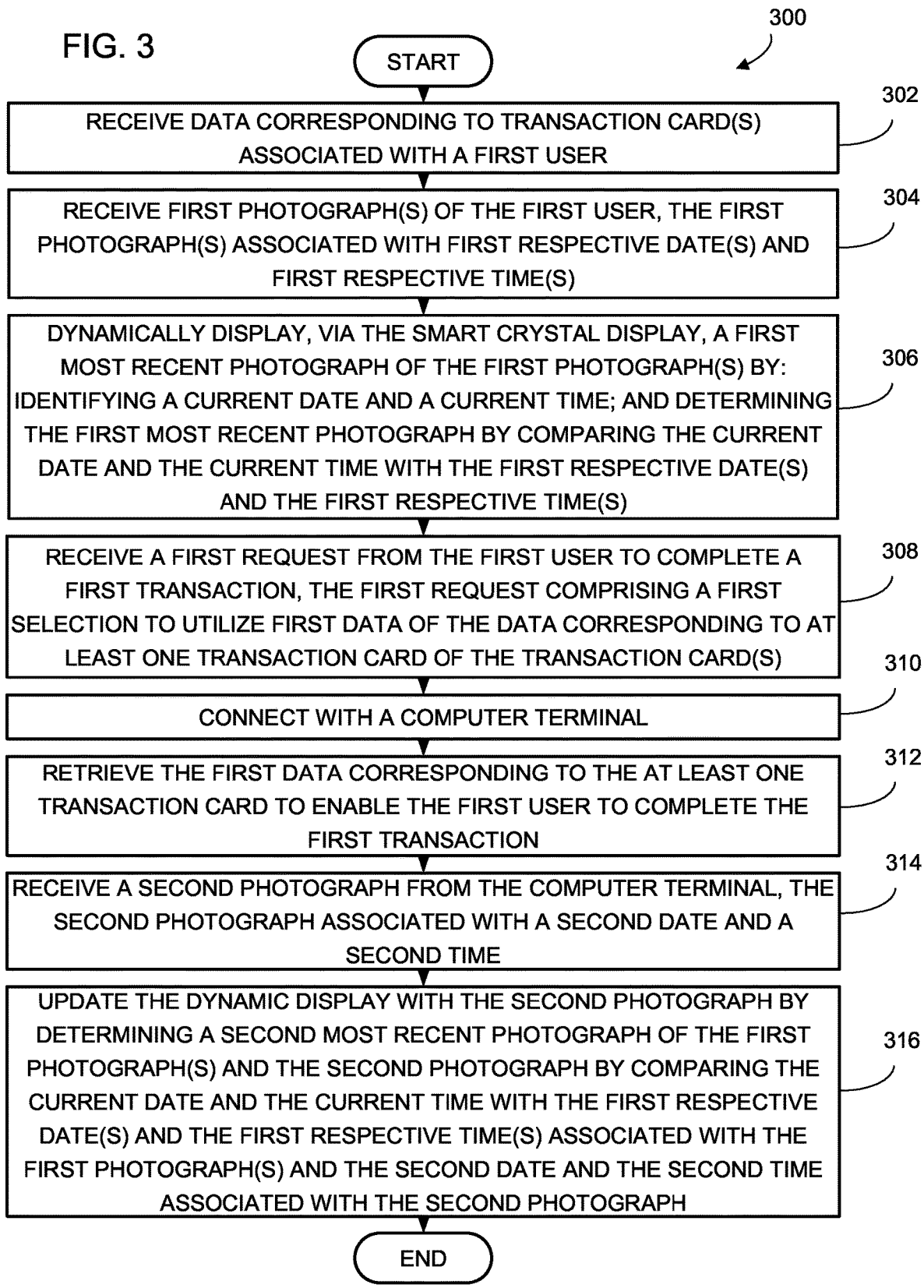

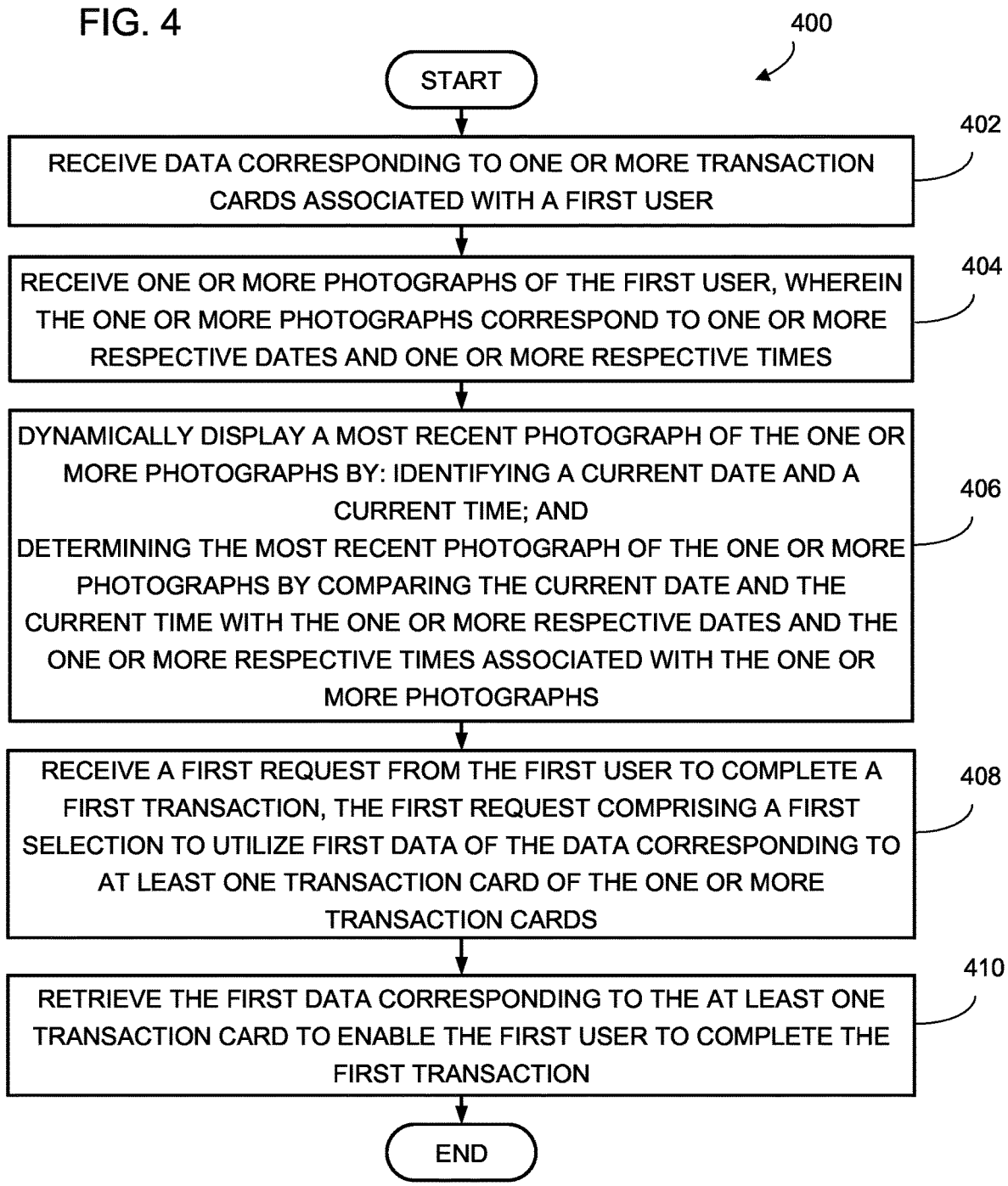

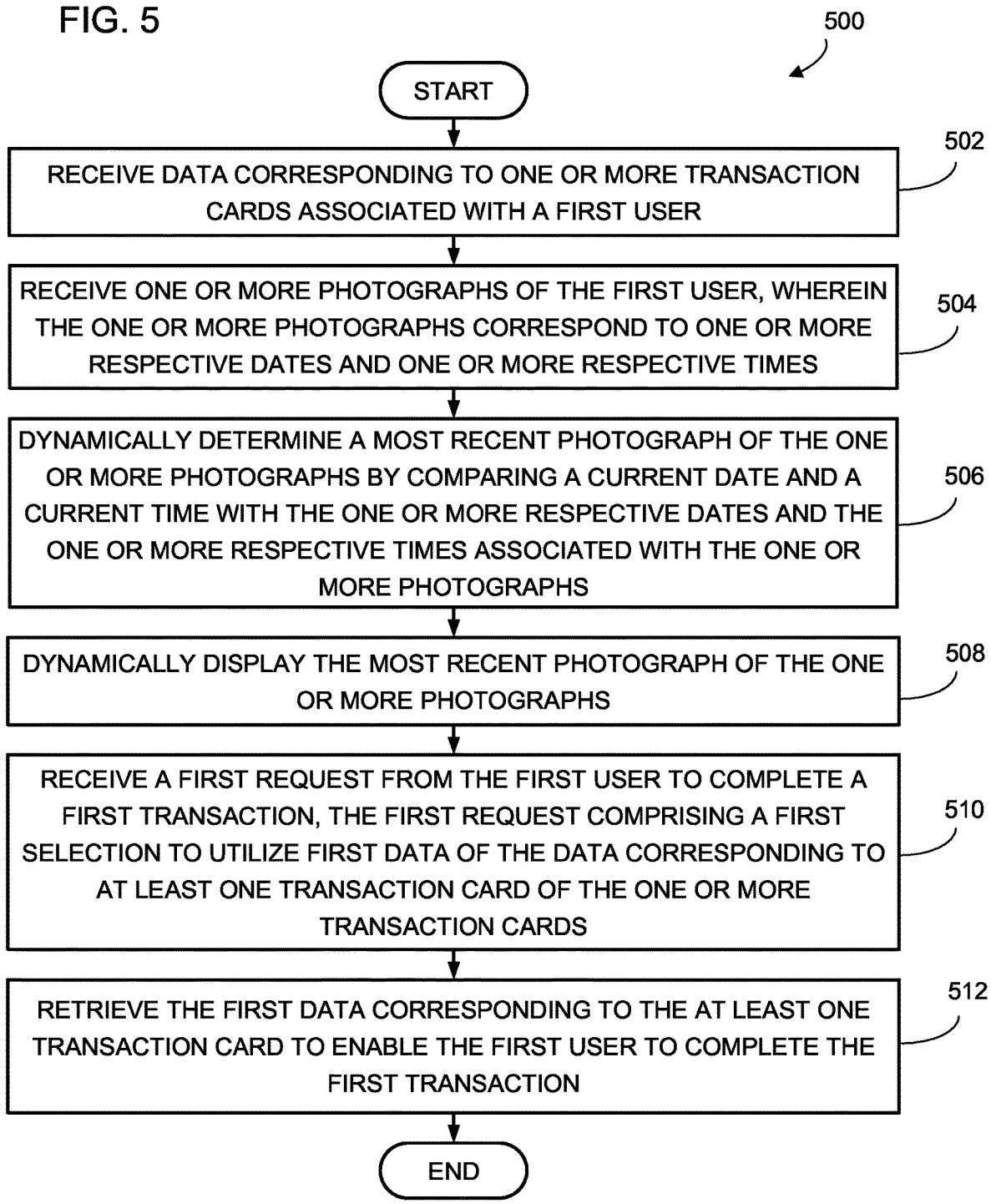

SYSTEMS AND METHODS FOR STORING DYNAMIC DATA

FIELD

The disclosed technology relates to systems and methods for storing dynamic data, and more particularly, for storing dynamic data within a single device used for conducting transactions.

BACKGROUND

People typically carry around with them a variety of physical cards such as transaction cards, identification cards, insurance cards, and the like, for purposes of conducting transactions or interactions with law enforcement, government agencies, merchants, etc. Carrying around each of these individual cards can be quite cumbersome; however, necessary due to each card containing information required for a unique purpose. Additionally, those types of cards comprising photo identification (e.g., a driver's license) typically include a static image of the card holder, which can become outdated especially as people's appearances change over time.

Accordingly, there is a need for improved systems and methods for storing dynamic data. Embodiments of the present disclosure are directed to this and other considerations.

SUMMARY

Disclosed embodiments may include a device for storing dynamic data. The device may include a capacitor configured to receive power from an external power source, one or more processors, a smart crystal display, and memory in communication with the one or more processors and storing first instructions that are configured to cause the device to perform a method for dynamically storing data. The device may receive data corresponding to one or more transaction cards associated with a first user. The device may receive one or more first photographs of the first user, the one or more first photographs associated with one or more first respective dates and one or more first respective times. The device may dynamically display, via the smart crystal display, a first most recent photograph of the one or more first photographs by identifying a current date and a current time; and determining the first most recent photograph of the one or more first photographs by comparing the current date and the current time with the one or more first respective dates and the one or more first respective times associated with the one or more first photographs. The device may receive a first request from the first user to complete a first transaction, the first request comprising a first selection to utilize first data of the data corresponding to at least one transaction card of the one or more transaction cards. The device may connect with a computer terminal. In response to connecting with the computer terminal, the device may retrieve the first data corresponding to the at least one transaction card to enable the first user to complete the first transaction; may receive a second photograph from the computer terminal, the second photograph associated with a second date and a second time; and may update the dynamic display with the second photograph by determining a second most recent photograph of the one or more first photographs and the second photograph by comparing the current date and the current time with the one or more first respective dates and the one or more first respective times associated with the one or more first photographs and the second date and the second time associated with the second photograph.

In another embodiment, the device may include one or more processors, a display, and memory in communication with the one or more processors and storing first instructions that are configured to cause the device to perform a method for dynamically storing data. The device may receive data corresponding to one or more transaction cards associated with a first user. The device may store the data in the one or more databases. The device may receive one or more photographs of the first user, wherein the one or more photographs correspond to one or more respective dates and one or more respective times. The device may dynamically display a most recent photograph of the one or more photographs by identifying a current date and a current time; and determining the most recent photograph of the one or more photographs by comparing the current date and the current time with the one or more respective dates and the one or more respective times associated with the one or more photographs. The device may receive a first request from the first user to complete a first transaction, the first request comprising a first selection to utilize first data of the data corresponding to at least one transaction card of the one or more transaction cards. The device may retrieve the first data corresponding to the at least one transaction card to enable the first user to complete the first transaction.

In another embodiment, the device may include one or more processors, a display, and memory in communication with the one or more processors and storing first instructions that are configured to cause the device to perform a method for dynamically storing data. The device may receive data corresponding to one or more transaction cards associated with a first user. The device may receive one or more photographs of the first user, wherein the one or more photographs correspond to one or more respective dates and one or more respective times. The device may dynamically determine a most recent photograph of the one or more photographs by comparing a current date and a current time with the one or more respective dates and the one or more respective times associated with the one or more photographs. The device may dynamically display the most recent photograph of the one or more photographs. The device may receive a first request from the first user to complete a first transaction, the first request comprising a first selection to utilize first data of the data corresponding to at least one transaction card of the one or more transaction cards. The device may retrieve the first data corresponding to the at least one transaction card to enable the first user to complete the first transaction.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 2A-2C are a block diagram of an example device used for dynamically storing data, according to an example implementation of the disclosed technology.

FIG. 3 is a flow diagram illustrating an exemplary method for dynamically storing data, in accordance with certain embodiments of the disclosed technology.

FIG. 4 is a flow diagram illustrating an exemplary method for dynamically storing data, in accordance with certain embodiments of the disclosed technology.

FIG. 5 is a flow diagram illustrating an exemplary method for dynamically storing data, in accordance with certain embodiments of the disclosed technology.

DETAILED DESCRIPTION

Figure 1:
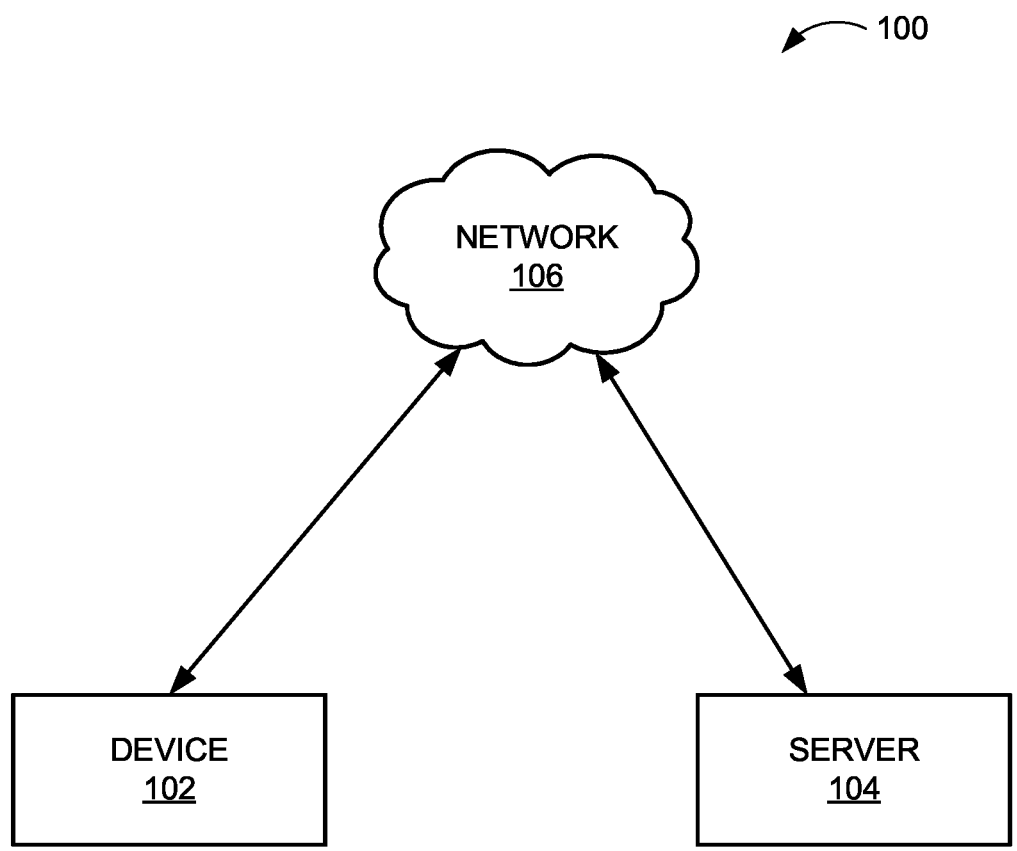
FIG. 1 is a block diagram of an example system that may be used to dynamically store data, according to an example implementation of the disclosed technology.

Examples of the present disclosure relate to systems and methods for dynamically storing data. In particular, the disclosed technology relates to systems and methods for receiving data corresponding to one or more transaction cards associated with a first user, receiving photographs of the first user, dynamically determining and displaying the most recent photograph out of the received photographs, and retrieving a portion of the data corresponding to one of the one or more transaction cards in response to receiving a request from the first user to complete a transaction. The systems and methods described herein are thus necessarily rooted in computer and technology as they utilize a single physical device for purposes of dynamically storing and displaying multiple forms of data.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system that may be used to dynamically store data, according to an example implementation of the disclosed technology. The components and arrangements shown in FIG. 1 are not intended to limit the disclosed embodiments as the components used to implement the disclosed processes and features may vary. As shown, a system 100 may comprise a device 102, further described below with respect to FIGS. 2A-2C, interacting with a server 104 via a network 106.

Server 104 may include a computer system configured to generate and provide one or more websites accessible to users, as well as any other individuals involved in accessing system 100's normal operations. Server 104 may include a computer system configured to receive communications from device 102 via for example, a mobile application, a chat program, an instant messaging program, a voice-to-text program, an SMS message, email, or any other type or format of written or electronic communication. Server 104 may have one or more processors and one or more web server databases, which may be any suitable repository of website data. Information stored in server 104 may be accessed (e.g., retrieved, updated, and added to) via network 106 and/or a local network by one or more devices or systems of system 100. In some embodiments, server 104 may host websites or applications that may be accessed by device 102. For example, server 104 may host a financial service provider website that a user device may access by providing authenticated login information. According to some embodiments, server 104 may include software tools, similar to those described below with respect to device 102, that may allow server 104 to obtain network identification data from device 102.

Network 106 may be of any suitable type, including individual connections via the Internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

FIGS. 2A-2C provide an example of a device 102 configured to dynamically store data. FIGS. 2A-2C are described simultaneously herein, as each sub-figure shows the same physical device 102 yet displayed from different perspectives to illustrate different internal and external components.

Device 102 may be configured at various sizes and/or shapes and made of a substrate, such as plastic, metal, etc. For example, device 102 may be a similar size and shape as a standard transaction card (e.g., a credit card), a USB memory stick, or a mobile phone case. A benefit of device 102 being a similar size and shape as a mobile phone case is that a user of device 102 may be able to physically connect device 102 to the user's mobile phone to eliminate the need to carry around two separate objects. Additionally, the user's mobile phone may provide a charging source for device 102, as further discussed below.

FIGS. 2A-2C provide an example of a device 102 shaped like a standard credit card, which may include a front surface 210 containing one or more general characters 212 and one or more personal identification characters 214, a back surface 220, one or more side surfaces 230, a charging port 232, a computer-readable chip 240, a display 250, a capacitor 260, a memory 270, one or more processors 280, and one or more databases 290. In some embodiments, device 102 may also include a magnetic strip. In some embodiments, device 102 may also include a machine learning model (MLM) that may be trained, for example, to recognize when device 102 may receive a photograph of someone other than the user, thereby reducing potential fraudulent activity, as further discussed below. In certain implementations, a MLM may issue commands in response to processing an event, in accordance with a model that may be continuously or intermittently updated. Moreover, processor 280 may execute one or more programs (such as via a rules-based platform or the trained MLM), that, when executed, perform functions related to disclosed embodiments.

General characters 212 may contain non-sensitive information, such as merchant or other entity identifiers (e.g., merchant logo, card carrier, etc.). General characters 212 may be formed primarily in one or more colors and/or one or more materials. General characters 212 may be formed as such in order to either blend in with or provide contrast with one or more other features of device 102, e.g., front surface 210.

Personal identification characters 214 may contain sensitive information, such as personal information (e.g., name, address, social security number, etc.), financial information (e.g., card number, cardholder name, an expiration date, a validation code, etc.), and the like.

Charging port 232 may be configured at various sizes and/or shapes, and may be configured to be compatible with various forms of charging devices, such as inductive charging devices. That is, charging port 232 may comprise one or more inductive charging coils to enable device 102 be charged via inductive charging technology. In some embodiments, an inductive charging device may itself receive a charge via, e.g., a USB device. For example, as discussed above, a user of device 102 may charge device 102 via inductive charging through the use of the user's mobile phone.

Chip 240 may be a smart chip or an integrated circuit. In this regard, chip 240 may include a microprocessor and memory, such as read only memory (ROM) and random-access memory (RAM). Additionally, chip 240 may include one or more contact pads to receive voltage to power device 102 and exchange signals with a terminal. In some embodiments, chip 240 may be configured to execute one or more applications. The applications may allow chip 240 to process payments, for example, using a payment application. For example, chip 240 may verify a cardholder via a method supported by the terminal and agreed upon by chip 240. Additionally, chip 240 may confirm the transaction, for example, by verifying the cardholder, determining any processing restrictions, authenticating offline data associated with the cardholder, or any combination thereof. In some instances, the terminal may determine that the transaction is required to be processed via online processing. In these instances, chip 240 may generate a request authorization that is transmitted to the issuer, via the terminal. In other examples, one or more applications may allow chip 240 to determine whether a current transaction is a duplicate of an earlier transaction. In further examples, one or more applications may allow chip 240 to perform cryptographic processing, authenticate device 102, define risk management parameters (e.g., when the transaction may be conducted offline), digitally sign payment data, and verify the cardholder. Additionally, or alternatively, chip 240 may be a dual interface chip that provides for contact and contact-less interfaces.

Display 250 may be capable of dynamically displaying images, such as in the form of a smart crystal display, an organic light-emitting diode (LED) display, a micro-LED display, etc. Display 250 may be configured as a low powered display, such as a ROM flashed-style liquid crystal display. In some embodiments, display 250 may be solar powered.

Capacitor 260 may be configured to receive power from an external power source. In some embodiments, capacitor 260 may be configured to charge when device 102 connects with a computer terminal. In some embodiments, capacitor 260 may be configured to charge wirelessly via inductive charging coil 262 when device 102 is placed within an electromagnetic field.

Memory 270 may include one or more memory devices that store data and instructions used to perform one or more features of the disclosed embodiments. Memory 270 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 270 may include software components that, when executed by processor 280, as described below, perform one or more processes consistent with the disclosed embodiments. In some embodiments, memory 270 may include one or more databases for storing related data to enable device 102 to perform one or more of the processes and functionalities associated with the disclosed embodiments.

Memory 270 may include, in some implementations, one or more suitable types of memory (e.g. such as volatile or non-volatile memory, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 270.

Device 102 may also be communicatively connected to one or more memory devices (e.g., databases) locally or through a network. The remote memory devices may be configured to store information and may be accessed and/or managed by device 102. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Processor 280 may include one or more of a microprocessor, microcontroller, digital signal processor, co-processor or the like or combinations thereof capable of executing stored instructions and operating upon stored data. Processor 280 may be one or more known processing devices, such as, but not limited to, a microprocessor from the Pentium™ family manufactured by Intel™ or the Turion™ family manufactured by AMD™. Processor 280 may constitute a single core or multiple core processor that executes parallel processes simultaneously. For example, processor 280 may be a single core processor that is configured with virtual processing technologies. In certain embodiments, processor 280 may use logical processors to simultaneously execute and control multiple processes. Processor 280 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

Processor 280 may execute one or more programs located remotely from device 102. For example, device 102 may access one or more remote programs that, when executed, perform functions related to disclosed embodiments.

In accordance with certain example implementations of the disclosed technology, device 102 may include one or more storage devices configured to store information used by processor 280 (or other components) to perform certain functions related to the disclosed embodiments. In one example, device 102 may include memory 270 that includes instructions to enable processor 280 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

FIG. 3 provides a flow diagram illustrating an exemplary method 300 for dynamically storing data, in accordance with certain embodiments of the disclosed technology. Method 300 may be performed by one or more components of system 100, as described above with respect to FIGS. 1 and 2A-2C.

In block 302 of FIG. 3, the system (e.g., via device 102) may receive data corresponding to one or more transaction cards associated with a first user. The one or more transaction cards may comprise one or more of financial cards, banking cards, medical cards, personal identification cards, insurance cards, merchant rewards cards, organization affiliation cards, vehicle cards, tickets, and the like, or combinations thereof. In some embodiments, the system may receive the data when connected to a computer terminal. For example, a user associated with device 102 may manually upload data corresponding to multiple transaction cards of the user to the device 102 such that device 102 may store the data, via, e.g., memory 270 or database 290, for later retrieval. In some embodiments, the system may receive the data via inductive technology (e.g., NFC, Bluetooth™, etc.). This feature provides the added benefit of enabling a user to carry around a single card or device, rather than having to carry a multitude of transaction, identification, etc., cards in, e.g., a wallet or purse.

In block 304, the system (e.g., via device 102) may receive one or more first photographs of the first user, the one or more first photographs associated with one or more first respective dates and one or more first respective times. In some embodiments, the system may receive the one or more first photographs when connected to a computer terminal affiliated with, for example, an automated teller machine (ATM), a merchant point of sale (POS), an entity location, a government agency, etc. In some embodiments, the system may receive the one or more first photographs via inductive technology (e.g., NFC, Bluetooth™, etc.). In some embodiments, the system may recognize a time and/or date stamp associated with each received photograph, e.g., corresponding to when the photo was taken or when the photo was received by the system.

In some embodiments, the system may utilize an MLM to ensure each of the received one or more first photographs corresponds to the first user. That is, each time the system receives a new photograph, the MLM may compare the new photograph to previously received photographs to ensure the new photograph comprises an image of the first user and not some other user (e.g., a fraudster). The MLM may be trained by providing the MLM with a training data that includes one or more photographs each with one or more labels corresponding to the one or more photographs. Based on the training data, the MLM may classify unlabeled data sets, such as each of the received one or more first photographs, in order to determine whether each of the one or more first photographs corresponds to the first user.

In such cases where the MLM determines any of the received one or more first photographs does not correspond to the first user, the system may be configured to transmit an alert, for example, to a financial institution associated with the first user, one or more user devices associated with the first user, etc., to indicate potential fraudulent activity. This feature provides the benefit of reducing potentially fraudulent activity in the event an unauthorized user (e.g., a fraudster) attempts to use a device 102 belonging to another user.

In block 306, the system (e.g., via device 102) may dynamically display (e.g., via display 250) a first most recent photograph of the one or more first photographs by: identifying a current date and a current time; and determining the first most recent photograph of the one or more first photographs by comparing the current date and the current time with the one or more first respective dates and the one or more first respective times associated with the one or more first photographs. That is, the system may be configured to first be able to recognize a current date and/or time (e.g., via network 106). The system may then be configured to compare the current date and/or time with each of the respective dates and times associated with each previously received photograph, as described above with respect to block 304, such that the system may determine which single photograph is the most current.

In block 308, the system (e.g., via device 102) may receive a first request from the first user to complete a first transaction, the first request comprising a first selection to utilize first data of the data corresponding to at least one transaction card of the one or more transaction cards. In some embodiments, the system may receive the request via a computer terminal, e.g., a merchant POS terminal. For example, a user may insert device 102 into the merchant POS terminal and may receive a first prompt, e.g., on the merchant POS terminal display or on the user's mobile device (e.g., via a push notification), to select which transaction card the user would like to use for completing a transaction. The user may have, for example, ten different transaction cards stored on device 102, and as such, the first prompt may notify the user of these ten transaction cards and enable the user to select which card to use (e.g., via a user input on a graphical user interface (GUI)). The user may then receive a second prompt (e.g., via the same way the user received the first prompt) asking the user if he or she would like to continue using the selected transaction card each time the user attempts to complete a transaction with the merchant associated with the merchant POS terminal. In other embodiments, the system may receive the request via an online marketplace. For example, the user may attempt to use device 102 to complete an online transaction. In such case, the user may receive one or more similar prompts as discussed above (e.g., via the user's mobile phone), to select which transaction card should be used to complete the transaction and/or future transactions with the same merchant. In other embodiments, a user may pre-assign each of the one or more transaction cards stored on device 102 with a respective one or more merchants. For example, upon uploading the one or more transaction cards to device 102, as discussed above, the user may have the capability to log into a web application via a GUI of a user device (e.g., a mobile phone, laptop, etc.) to input which one or more merchants should be assigned to the one or more transaction cards. In such case, when the user later goes to use device 102 (e.g., at a merchant POS terminal), the system may be configured to recognize which one of the one or more transaction cards was previously assigned to the present merchant (e.g., by recognizing or matching merchant identification codes).

In block 310, the system (e.g., via device 102) may connect with a computer terminal. That is, the system may be required to be connected to a computer terminal (e.g., a merchant POS terminal, an ATM, etc.) in order to retrieve data and/or dynamically display data, as described further below.

In response to connecting with the computer terminal, in block 312, the system (e.g., via device 102) may retrieve the first data corresponding to the at least one transaction card to enable the first user to complete the first transaction. The system may retrieve the first data based on receiving the user's request, as discussed above with respect to block 308.

In block 314, also in response to connecting with the computer terminal, the system (e.g., via device 102) may receive a second photograph from the computer terminal, the second photograph associated with a second date and a second time. The system may receive the second photograph is a similar fashion as it received the first photographs, as described above with respect to block 304.

In some embodiments, the system may utilize an MLM to ensure the received second photograph corresponds to the first user, as discussed above with respect to block 304.

In block 316, also in response to connecting with the computer terminal, the system (e.g., via device 102) may update the dynamic display (e.g., display 250) with the second photograph by determining a second most recent photograph of the one or more first photographs and the second photograph by comparing the current date and the current time with the one or more first respective dates and the one or more first respective times associated with the one or more first photographs and the second date and the second time associated with the second photograph. That is, each time the system connects to a computer terminal, the system may make an updated determination as to which photograph, out of all received and/or stored photographs is most current, and display (e.g., via display 250) that most current photograph. This feature provides the added benefit of enabling a user to always carry around a most recent photo identification for purposes of conducting certain transactions (e.g., interacting with law enforcement, government agencies, etc.).

Method 400 of FIG. 4 is similar to method 300 of FIG. 3, except that method 400 includes continuously receiving and updating the displayed photo without having to connect to a computer terminal, while method 300 includes connecting to a computer terminal to receive and update new photos. The descriptions of block 402, 404, 406, 408, and 410 are the same as or similar to the respective descriptions of blocks 302, 304, 306, 308, and 312 and as such, are not repeated herein for brevity.

Method 500 of FIG. 5 is also similar to method 300 of FIG. 3, except that method 500 includes continuously determining and displaying a most recent photo without having to connect to a computer terminal, while method 300 includes connecting to a computer terminal to receive and update new photos. The descriptions of blocks 502, 504, 506, 508, 510, and 512 are the same as or similar to the respective descriptions of blocks 302, 304, 306 (corresponding to blocks 506 and 508), 308, and 312 of method 300 and as such, are not repeated herein for brevity.

Example Use Case

The following example use case describes an example of a typical user flow pattern. This section is intended solely for explanatory purposes and not in limitation.

In one example, a user may upload data corresponding to a plurality of transaction and identification cards to a single device, wherein the single device looks like a standard credit card. The user may be able to carry around this single device in lieu of a plurality of transaction cards (e.g., driver's license, medical insurance card, credit card, etc.). The single device may be configured to receive a photograph of the user when, for example, the single device is plugged into a merchant POS terminal. The single device may be able to determine, based on time and/or date stamps associated with each received photograph, which photograph is most recent, and may display the most recent photograph of the user via a smart crystal display. The user may keep the device charged by periodically charging the device via inductive charging. The user may take the single device with him when going to conduct a certain transaction, such as making a purchase at a merchant POS. The user may insert the single device into the merchant POS terminal to complete the certain transaction. The user may receive a push notification on the user's mobile device indicating that the user has twelve transaction cards uploaded to the single device, and asking the user which of the twelve transaction cards he would like to use for completing this transaction. The push notification may list the twelve transaction cards along with a link labeled "select" next to each of the transaction cards. The user may then select which card to use for the present transaction. The user may then receive a second prompt asking the user if he would like to use the selected transaction card each time a transaction is attempted with that particular merchant. The user may be able to respond to the second prompt by clicking either a "yes" or "no" link displayed within the push notification on the user's mobile device. Based on the user's transaction card selection, the merchant POS terminal may then be able to recognize the data associated with the selected transaction card in order to complete the transaction.

In some examples, disclosed systems or methods may involve one or more of the following clauses:

Clause 1: A device comprising: a capacitor configured to receive power from an external power source; one or more processors; a smart crystal display; and a memory in communication with the one or more processors and storing instructions that, when executed by the one or more processors, are configured to cause the device to: receive data corresponding to one or more transaction cards associated with a first user; receive one or more first photographs of the first user, the one or more first photographs associated with one or more first respective dates and one or more first respective times; dynamically display, via the smart crystal display, a first most recent photograph of the one or more first photographs by: identifying a current date and a current time; and determining the first most recent photograph of the one or more first photographs by comparing the current date and the current time with the one or more first respective dates and the one or more first respective times associated with the one or more first photographs; receive a first request from the first user to complete a first transaction, the first request comprising a first selection to utilize first data of the data corresponding to at least one transaction card of the one or more transaction cards; connect with a computer terminal; and in response to connecting with the computer terminal: retrieve the first data corresponding to the at least one transaction card to enable the first user to complete the first transaction; receive a second photograph from the computer terminal, the second photograph associated with a second date and a second time; and update the dynamic display with the second photograph by determining a second most recent photograph of the one or more first photographs and the second photograph by comparing the current date and the current time with the one or more first respective dates and the one or more first respective times associated with the one or more first photographs and the second date and the second time associated with the second photograph.

Clause 2: The device of clause 1, wherein the one or more transaction cards comprise one or more of financial cards, banking cards, medical cards, personal identification cards, insurance cards, merchant rewards cards, organization affiliation cards, vehicle cards, tickets, or combinations thereof.

Clause 3: The device of clause 1, wherein the one or more first photographs are received from one or more of automated teller machines (ATMs), point of sale (POS) terminals, affiliated entities, government agencies, or combinations thereof.

Clause 4: The device of clause 1, wherein the instructions are further configured to cause the device to: determine, via a machine learning model, whether the one or more first photographs and the second photograph correspond to the first user; and responsive to determining the one or more first photographs or the second photograph does not correspond to the first user, transmit an alert indicating potential fraudulent activity.

Clause 5: The device of clause 1, wherein the smart crystal display is solar powered.

Clause 6: The device of clause 1, wherein the capacitor charges when the device connects with the computer terminal.

Clause 7: A device comprising: one or more processors; a display; and a memory in communication with the one or more processors and storing instructions that, when executed by the one or more processors, are configured to cause the device to: receive data corresponding to one or more transaction cards associated with a first user; receive one or more photographs of the first user, wherein the one or more photographs correspond to one or more respective dates and one or more respective times; dynamically display a most recent photograph of the one or more photographs by: identifying a current date and a current time; and determining the most recent photograph of the one or more photographs by comparing the current date and the current time with the one or more respective dates and the one or more respective times associated with the one or more photographs; receive a first request from the first user to complete a first transaction, the first request comprising a first selection to utilize first data of the data corresponding to at least one transaction card of the one or more transaction cards; and retrieve the first data corresponding to the at least one transaction card to enable the first user to complete the first transaction.

Clause 8: The device of clause 7, wherein the display comprises a smart crystal display.

Clause 9: The device of clause 8, wherein the smart crystal display is solar powered.

Clause 10: The device of clause 7, further comprising: a capacitor configured to receive power from an external power source.

Clause 11: The device of clause 7, wherein the one or more transaction cards comprise one or more of financial cards, banking cards, medical cards, personal identification cards, insurance cards, merchant rewards cards, organization affiliation cards, vehicle cards, tickets, or combinations thereof.

Clause 12: The device of clause 7, wherein the one or more photographs are received from one or more of automated teller machines (ATMs), point of sale (POS) terminals, affiliated entities, government agencies, or combinations thereof.

Clause 13: The device of clause 7, wherein the instructions are further configured to cause the device to: determine, via a machine learning model, whether the one or more first photographs and the second photograph correspond to the first user; and responsive to determining the one or more first photographs or the second photograph does not correspond to the first user, transmit an alert indicating potential fraudulent activity.

Clause 14: A device comprising: one or more processors; a display; and a memory in communication with the one or more processors and storing instructions that, when executed by the one or more processors, are configured to cause the device to: receive data corresponding to one or more transaction cards associated with a first user; receive one or more photographs of the first user, wherein the one or more photographs correspond to one or more respective dates and one or more respective times; dynamically determine a most recent photograph of the one or more photographs by comparing a current date and a current time with the one or more respective dates and the one or more respective times associated with the one or more photographs; dynamically display the most recent photograph of the one or more photographs; receive a first request from the first user to complete a first transaction, the first request comprising a first selection to utilize first data of the data corresponding to at least one transaction card of the one or more transaction cards; and retrieve the first data corresponding to the at least one transaction card to enable the first user to complete the first transaction.

Clause 15: The device of clause 14, wherein the display comprises a smart crystal display.

Clause 16: The device of clause 15, wherein the smart crystal display is solar powered.

Clause 17: The device of clause 14, further comprising: a capacitor configured to receive power from an external power source.

Clause 18: The device of clause 14, wherein the one or more transaction cards comprise one or more of financial cards, banking cards, medical cards, personal identification cards, insurance cards, merchant rewards cards, organization affiliation cards, vehicle cards, tickets, or combinations thereof.

Clause 19: The device of clause 14, wherein the one or more photographs are received from one or more of automated teller machines (ATMs), point of sale (POS) terminals, affiliated entities, government agencies, or combinations thereof.

Clause 20: The device of clause 14, wherein the instructions are further configured to cause the device to: determine, via a machine learning model, whether the one or more first photographs and the second photograph correspond to the first user; and responsive to determining the one or more first photographs or the second photograph does not correspond to the first user, transmit an alert indicating potential fraudulent activity.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors;
   a device comprising a display; and
   a memory in communication with the one or more processors and storing instructions that, when executed by the one or more processors, are configured to cause the device to:
   receive data corresponding to one or more transaction cards associated with a first user;
   receive one or more photographs corresponding to one or more respective dates and one or more respective times;
   train a machine learning model (MLM) based on a training data comprising one or more labeled photographs to generate a trained MLM, wherein the MLM is stored on the device;
   determine, via the trained MLM, a first photograph of the one or more photographs that does not correspond to the first user;
   responsive to determining the first photograph of the one or more photographs does not correspond to the first user, transmit an alert indicating potentially fraudulent activity;
   dynamically display, via the display, a most recent photograph of the first user by:
   identifying a current date and a current time;
   determining, via the trained MLM, a second photograph of the one or more photographs that corresponds to the first user; and
   determining the most recent photograph of the second photograph of the one or more photographs by comparing the current date and the current time with the one or more respective dates and the one or more respective times associated with the second photograph of the one or more photographs;
   receive a first request from the first user to complete a first transaction;
   send a prompt to a mobile device associated with the first user, the prompt requesting the first user select a transaction card of the one or more transaction cards to apply to the first transaction;
   cause the mobile device associated with the first user to display the prompt via a graphical user interface (GUI);
   receive, from the GUI of the mobile device, a response to the prompt comprising a first selection to utilize first data of the data corresponding to at least one transaction card of the one or more transaction cards; and responsive to receiving the response, retrieve the first data corresponding to the at least one transaction card to enable the first user to complete the first transaction.

2. The system of claim 1, wherein the display comprises a smart crystal display.

3. The system of claim 2, wherein the smart crystal display is solar powered.

4. The system of claim 1, further comprising:
a capacitor configured to receive power from an external power source.

5. The system of claim 1, wherein the one or more transaction cards comprise one or more of financial cards, banking cards, medical cards, personal identification cards, insurance cards, merchant rewards cards, organization affiliation cards, vehicle cards, tickets, or combinations thereof.

6. The system of claim 1, wherein the one or more photographs are received from one or more of automated teller machines (ATMs), point of sale (POS) terminals, affiliated entities, government agencies, or combinations thereof.

7. A system comprising:
one or more processors;
a device comprising a display; and
a memory in communication with the one or more processors and storing instructions that, when executed by the one or more processors, are configured to cause the device to:
receive data corresponding to one or more transaction cards associated with a first user;
receive one or more photographs corresponding to one or more respective dates and one or more respective times;
train a machine learning model (MLM) based on a training data comprising one or more labeled photographs to generate a trained MLM, wherein the MLM is stored on the device;
determine, via the trained MLM, a first photograph of the one or more photographs that does not correspond to the first user;
responsive to determining the first photograph of the one or more photographs does not correspond to the first user, transmit an alert indicating potentially fraudulent activity;
dynamically determine a most recent photograph of the first user by:
determining, via the trained MLM, a second photograph of the one or more photographs that corresponds to the first user; and
comparing a current date and a current time with the one or more respective dates and the one or more respective times associated with the second photograph of the one or more photographs;
dynamically display the most recent photograph of the first user;
receive a first request from the first user to complete a first transaction;
send a prompt to a mobile device associated with the first user, the prompt requesting the first user select a transaction card of the one or more transaction cards to apply to the first transaction;
cause the mobile device associated with the first user to display the prompt via a graphical user interface (GUI);
receive, from the GUI of the mobile device, a response to the prompt comprising a first selection to utilize first data of the data corresponding to at least one transaction card of the one or more transaction cards; and
responsive to receiving the response, retrieve the first data corresponding to the at least one transaction card to enable the first user to complete the first transaction.

8. The system of claim 7, wherein the display comprises a smart crystal display.

9. The system of claim 8, wherein the smart crystal display is solar powered.

10. The system of claim 7, further comprising:
a capacitor configured to receive power from an external power source.

11. The system of claim 7, wherein the one or more transaction cards comprise one or more of financial cards, banking cards, medical cards, personal identification cards, insurance cards, merchant rewards cards, organization affiliation cards, vehicle cards, tickets, or combinations thereof.

12. The system of claim 7, wherein the one or more photographs are received from one or more of automated teller machines (ATMs), point of sale (POS) terminals, affiliated entities, government agencies, or combinations thereof.

* * * * *